(12) United States Patent
Yamashita et al.

(10) Patent No.: US 6,454,850 B2
(45) Date of Patent: Sep. 24, 2002

(54) CEMENT ADMIXTURE AND CEMENT COMPOSITION COMPRISING THIS

(75) Inventors: Akihiko Yamashita, Ibaraki; Hiroshi Mitsukawa, Hirakata; Tsuyoshi Hirata, Kobe, all of (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 09/840,397

(22) Filed: Apr. 23, 2001

(30) Foreign Application Priority Data

Apr. 28, 2000 (JP) .......................... 2000-130949

(51) Int. Cl.$^7$ .............................. C04B 24/04
(52) U.S. Cl. .................. 106/724; 106/727; 106/823
(58) Field of Search ................. 106/724, 727, 106/823

(56) References Cited

U.S. PATENT DOCUMENTS

| | | |
|---|---|---|
| 4,547,223 A | 10/1985 | Goto et al. |
| 4,975,121 A | 12/1990 | Sakuta et al. |
| 5,174,820 A | 12/1992 | Sakuta et al. |
| 5,181,961 A | 1/1993 | Umaki et al. |
| 5,556,460 A | 9/1996 | Berke et al. |
| 5,614,017 A | 3/1997 | Shawl |
| 5,670,578 A | 9/1997 | Shawl |

FOREIGN PATENT DOCUMENTS

| | | |
|---|---|---|
| EP | 0 350 904 A2 | 1/1990 |
| EP | 0 884 290 A2 | 12/1998 |
| JP | 56-37259 A | 4/1981 |
| JP | 59-21557 A | 2/1984 |
| JP | 59-128250 A | 7/1984 |
| JP | 59-152253 A | 8/1984 |
| JP | 2-124750 A | 5/1990 |
| JP | 2-307849 A | 12/1990 |
| JP | 11-60302 A | 3/1999 |
| JP | 11-512385 A | 10/1999 |
| JP | 2000-159883 A | 6/2000 |
| WO | WO82/03071 A1 | 9/1982 |
| WO | WO97/35814 A1 | 10/1997 |
| WO | WO01/10920 A1 | 2/2001 |
| WO | WO01/40337 A2 | 6/2001 |

*Primary Examiner*—Paul Marcantoni
(74) *Attorney, Agent, or Firm*—Haugen Law Firm PLLP

(57) ABSTRACT

The present invention provides: a cement admixture which displays excellent cracking inhibition effect and brings about good fluidity even if the quantity of the cement admixture as added is small; and a cement composition comprising this cement admixture. The cement admixture comprises a polyalkylene glycol (A) and a polyalkylene glycol mono(meth) acrylate/unsaturated carboxylic acid-based copolymer (B), wherein: the average molecular weight (X) of the (A) is in the range of 400 to 10,000; the average molecular weight (X) of the (A) and the average molecular weight (Y) of a polyalkylene glycol chain portion of the (B) satisfy $0.9<(X/Y)<1.1$; and the weight ratio of the (A) to the (B) is in the range of (A)/(B)=0.02 to 0.3. The cement composition at least comprises the above cement admixture, water, and cement.

4 Claims, No Drawings

CEMENT ADMIXTURE AND CEMENT COMPOSITION COMPRISING THIS

BACKGROUND OF THE INVENTION

A. Technical Field

The present invention relates to a cement admixture and a cement composition comprising this. More specifically, the invention relates to: a cement admixture which is mixed into cement mixtures, such as cement paste, mortar, and concrete, and thereby can give the cement mixtures excellent cracking inhibition effect and excellent fluidity; and a cement composition comprising this admixture.

B. Background Art

In general, cement mixtures, such as cement paste, mortar, and concrete, are used in order to construct such as civil engineering structures and building structures. However, hitherto, there are problems in that: according to such as outside air temperature or humidity conditions, the volatilization of unreacted water from the concreted cement mixtures might promote the drying shrinkage to crack the hardened products, and the resultant cracks cause the deterioration of the strength and watertightness of the above structures. Furthermore, in recent years, there is a movement to bind in duty to give a guarantee against cracks due to the drying shrinkage. For example, a law regarding the promotion to ensure the house quality, which intends to add cracking of concrete to objects of a guarantee against defects, is put in effect. Therefore, it is desired to take effective countermeasures to suppress the drying shrinkage of the cement mixtures to thereby prevent cracking.

As to the means to suppress the drying shrinkage of the cement mixtures to a small one, it is effective to decrease the quantity of water (unit water quantity) for knead-mixing of concrete. For example, the Architectural Society of Japan prescribes that the upper limit value of the unit water quantity in high durable concrete should be 175 kg. Hitherto, high-performance water-reducing agents such as salts of β-naphthalenesulfonic acid-formaldehyde condensation products are conventionally used to satisfy this prescription.

However, in the case where the high-performance water-reducing agents are used, there are problems in that: chemical or physical cohesion of cement particles proceeds with the passage of time after knead-mixing, and the fluidity is therefore apt to decrease with the passage of time, with the result that there occur troubles with execution of works.

On the other hand, various studies are carried out also about shrinkage-reducing agents to suppress the drying shrinkage of the cement mixtures to a small one. For example, JP-B-051148/1981 proposes alkylene oxide adducts to alcohols having 1 to 4 carbon atoms, and JP-B-053214/1989 proposes ethylene oxide-propylene oxide co-adducts to di- to octahydric alcohols, and JP-B-053215/1989 proposes alkylene oxide adducts to lower alkylamines, and JP-A-152253/1984 proposes oligomeric polypropylene glycol, and JP-B-006500/1994 proposes low-molecular alcohols, and Japanese Patent No. 2825855 proposes alkylene oxide adducts to 2-ethylhexanol having 8 carbon atoms.

However, all these shrinkage-reducing agents are oligomers or low-molecular compounds having a molecular weight of not larger than hundreds, and therefore involve problems in that: for example, as is also described in "The Development of Concrete Admixture and Its Newest Technology" (1st edition, issued by CMC Co., Ltd. on Sep. 18, 1995), these shrinkage-reducing agents need to be used in a large standard amount of 2 to 6% of the unit cement weight, therefore the cost of concrete increases.

SUMMARY OF THE INVENTION

A. Object of the Invention

An object of the present invention is to provide: a cement admixture which displays excellent cracking inhibition effect and brings about good fluidity even if the quantity of the cement admixture as added is small; and a cement composition comprising this cement admixture.

B. Disclosure of the Invention

The present inventors diligently studied to solve the above-mentioned problems. As a result, they have completed the present invention by finding that: if a polyalkylene glycol having a specific molecular weight is allowed to coexist in a specific ratio with a polyalkylene glycol mono(meth)acrylate/unsaturated carboxylic acid-based copolymer having a polyalkylene glycol chain portion of which the average molecular weight is nearly equal to that of the above-mentioned polyalkylene glycol (the difference between these molecular weights is in a definite range), then the resultant mixture is a cement admixture which is extremely excellent in both properties of the drying shrinkage reducibility and the dispersibility.

Namely, a cement admixture, according to the present invention, comprises a polyalkylene glycol (A) and a polyalkylene glycol mono(meth)acrylate/unsaturated carboxylic acid-based copolymer (B), wherein: the average molecular weight (X) of the polyalkylene glycol (A) is in the range of 400 to 10,000; the average molecular weight (X) of the polyalkylene glycol (A) and the average molecular weight (Y) of a polyalkylene glycol chain portion of the copolymer (B) satisfy the following equation (1):

$$0.9 < (X/Y) < 1.1 \tag{1};$$

and the weight ratio of the polyalkylene glycol (A) to the copolymer (B) is in the range of (A)/(B)=0.02 to 0.3.

In addition, a cement composition, according to the present invention, at least comprises the above cement admixture according to the present invention, water, and cement.

These and other objects and the advantages of the present invention will be more fully apparent from the following detailed disclosure.

DETAILED DESCRIPTION OF THE INVENTION

The cement admixture, according to the present invention, comprises a polyalkylene glycol (A) (which might hereinafter simply be abbreviated to component A) and a polyalkylene glycol mono(meth)acrylate/unsaturated carboxylic acid-based copolymer (B) (which might hereinafter simply be abbreviated to component B). Hereinafter, each of them is explained in detail.

Polyalkylene glycol (A)

The component A in the present invention is, for example, represented by the following general formula (2):

$$R^1O(AO)_mH \tag{2}$$

wherein:
AO represents an oxyalkylene group having 2 to 18 carbon atoms (wherein: the AO-repeating units may be either identical with or different from each other and, if the AO-repeating units are in the form of a mixture of at least two thereof, they may be formed by any of block addition, random addition, and alternating addition);

m is an average molar number of addition of the oxyalkylene groups and represents a number of 8 to 250; and $R^1$ represents a hydrogen atom or a hydrocarbon group having 1 to 30 carbon atoms.

$R^1$ in the formula (2) is especially favorably a hydrocarbon group having 1 to 30 carbon atoms, more favorably 1 to 22 carbon atoms, still more favorably 1 to 18 carbon atoms, particularly favorably 1 to 12 carbon atoms. In particular, favorably for obtaining high drying shrinkage reducibility, $R^1$ is a hydrocarbon group having 4 to 12 carbon atoms. Specific examples of $R^1$ include: alkyl groups having 1 to 30 carbon atoms; benzene ring-containing aromatic groups having 6 to 30 carbon atoms, such as a phenyl group, alkylphenyl groups, phenylalkyl groups, alkyl group-substituted or phenyl group-substituted phenyl groups, and a naphthyl group; and alkenyl groups having 2 to 30 carbon atoms.

AO in the formula (2) is particularly favorably a linear or branched oxyalkylene group having 2 to 8 carbon atoms. Examples thereof include an oxyethylene group, an oxypropylene group, an oxybutylene group, and an oxystyrene group. Of these groups, the oxyethylene group, the oxypropylene group, and the oxybutylene group are favorable.

Specific examples of the component A include: alkoxypolyalkylene glycols obtained by addition reactions of alkylene oxides having 2 to 18 carbon atoms to any of the following alcohols: saturated aliphatic alcohols having 1 to 30 carbon atoms, such as methanol, ethanol, 2-propanol, 1-butanol, octanol, 2-ethyl-1-hexanol, nonyl alcohol, lauryl alcohol, cetyl alcohol, and stearyl alcohol; unsaturated aliphatic alcohols having 3 to 30 carbon atoms, such as allyl alcohol, methallyl alcohol, crotyl alcohol, and oleyl alcohol; alicyclic alcohols having 3 to 30 carbon atoms, such as cyclohexanol; and aromatic alcohols having 6 to 30 carbon atoms, such as phenol, phenylmethanol (benzyl alcohol), methylphenol (cresol), p-ethylphenol, dimethylphenol (xylenol), p-t-butylphenol, nonylphenol, dodecylphenol, phenylphenol, and naphthol; and further include polyalkylene glycols, such as polyethylene glycol, polypropylene glycol, and polyethylene polypropylene glycol.

In the present invention, it is important that the average molecular weight (X) of the aforementioned component A is in the range of 400 to 10,000. In the case where the average molecular weight (X) of the component A is less than 400 or more than 10,000, it is difficult to display sufficient drying shrinkage reducibility even using a small quantity. The average molecular weight (X) of the component A is favorably in the range of 500 to 9,000, more favorably 700 to 8,000, still more favorably 900 to 7,000, most favorably 1,000 to 6,000. Incidentally, in the present invention, the average molecular weight (X) of the component A can easily be calculated from the terminal end group, the sorts of the oxyalkylene groups, and their average molar number of addition in the component A. For example, if $R^1$, AO, and m in the general formula (2) are a methyl group, ethylene oxide, and 25 respectively, the average molecular weight (X) of the component A is calculated as 32+44×25=1,132. The average molar number of addition of the oxyalkylene groups in the component A (m in the formula (2)) is favorably in the range of 10 to 220, more favorably 15 to 200, still more favorably 20 to 170, most favorably 22 to 150, for the average molecular weight (X) of the component A to be in the above favorable range.

Polyalkylene glycol mono(meth)acrylate/unsaturated carboxylic acid-based copolymer (B)

The component (B) in the present invention comprises the following essential constitutional units: a unit (I) of the general formula (3) below as derived from a polyalkylene glycol mono(meth)acrylate-based monomer; and a unit (II) of the general formula (4) below as derived from an unsaturated carboxylic acid-based monomer.

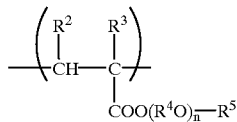

(3)

wherein:
$R^2$ and $R^3$, independently of each other, represent a hydrogen atom or a methyl group;
$R^4O$ represents an oxyalkylene group having 2 to 18 carbon atoms (wherein: the $R^4O$-repeating units may be either identical with or different from each other and, if the $R^4O$-repeating units are in the form of a mixture of at least two thereof, they may be formed by any of block addition, random addition, and alternating addition);
n is an average molar number of addition of the oxyalkylene groups and represents a number of 8 to 250; and
$R^5$ represents a hydrogen atom or a hydrocarbon group having 1 to 30 carbon atoms.

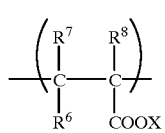

(4)

wherein:
$R^6$, $R^7$ and $R^8$, independently of each other, denote a hydrogen atom, a methyl group or a $(CH_2)_p COOX$ group;
X denotes a hydrogen atom, a monovalent metal, a divalent metal, an ammonium group or an organic amine group; and p denotes an integer of 0 to 2;
wherein if at least two COOX groups exist they may be in the form of an anhydride.

$R^5$ in the formula (3) is especially favorably a hydrocarbon group having 1 to 30 carbon atoms, more favorably 1 to 22 carbon atoms, still more favorably 1 to 18 carbon atoms, particularly favorably 1 to 12 carbon atoms. Examples of the hydrocarbon group having 1 to 30 carbon atoms include the same as those previously cited as examples of $R^1$ in the aforementioned formula (2).

$R^4O$ in the formula (3) is particularly favorably a linear or branched oxyalkylene group having 2 to 8, more favorably 2 to 4 carbon atoms. Examples thereof include an oxyethylene group, an oxypropylene group, an oxybutylene group, and an oxystyrene group. Of these groups, the oxyethylene group, the oxypropylene group, and the oxybutylene group are favorable.

Examples of a monomer (a) to give the constitutional unit (I) of the formula (3) include: adducts obtained by addition reactions of alkylene oxides having 2 to 18 carbon atoms to (meth)acrylic acid; and compounds obtained by esterification of alkoxypolyalkylene glycols with (meth)acrylic acid, wherein the alkoxypolyalkylene glycols are obtained by addition reactions of alkylene oxides having 2 to 18 carbon atoms to any of the following alcohols: saturated aliphatic alcohols having 1 to 30 carbon atoms, such as methanol, ethanol, 2-propanol, 1-butanol, octanol, 2-ethyl-1-hexanol, nonyl alcohol, lauryl alcohol, cetyl alcohol, and stearyl alcohol; unsaturated aliphatic alcohols having 3 to 30 carbon atoms, such as allyl alcohol, methallyl alcohol, crotyl alcohol, and oleyl alcohol; alicyclic alcohols having 3 to 30 carbon atoms, such as cyclohexanol; and aromatic alcohols having 6 to 30 carbon atoms, such as phenol, phenylmethanol (benzyl alcohol), methylphenol (cresol), p-ethylphenol, dimethylphenol (xylenol), p-t-butylphenol, nonylphenol, dodecylphenol, phenylphenol, and naphthol.

Specific examples of the monomer (a) include: various polyalkylene glycol mono(meth)acrylates such as polyethylene glycol mono(meth)acrylate, polypropylene glycol mono(meth)acrylate, and polybutylene glycol mono(meth)acrylate; and various alkoxypolyalkylene glycol mono(meth)acrylates, for example, as follows: various alkoxypolyethylene glycol mono(meth)acrylates such as methoxypolyethylene glycol mono(meth)acrylate, ethoxypolyethylene glycol mono(meth)acrylate, 1-propoxypolyethylene glycol mono(meth)acrylate, 2-propoxypolyethylene glycol mono(meth)acrylate, 1-butoxypolyethylene glycol mono(meth)acrylate, 2-butoxypolyethylene glycol mono(meth)acrylate, 2-methyl-1-propoxypolyethylene glycol mono(meth)acrylate, 2-methyl-2-propoxypolyethylene glycol mono(meth)acrylate, cyclohexoxypolyethylene glycol mono(meth)acrylate, 1-octoxypolyethylene glycol mono(meth)acrylate, 2-ethyl-1-hexoxypolyethylene glycol mono(meth)acrylate, nonylalkoxypolyethylene glycol mono(meth)acrylate, laurylalkoxypolyethylene glycol mono(meth)acrylate, cetylalkoxypolyethylene glycol mono(meth)acrylate, stearylalkoxypolyethylene glycol mono(meth)acrylate, phenoxypolyethylene glycol mono(meth)acrylate, phenylmethoxypolyethylene glycol mono(meth)acrylate, methylphenoxypolyethylene glycol mono(meth)acrylate, p-ethylphenoxypolyethylene glycol mono(meth)acrylate, dimethylphenoxypolyethylene glycol mono(meth)acrylate, p-t-butylphenoxypolyethylene glycol mono(meth)acrylate, nonylphenoxypolyethylene glycol mono(meth)acrylate, dodecylphenoxypolyethylene glycol mono(meth)acrylate, phenylphenoxypolyethylene glycol mono(meth)acrylate, naphthoxypolyethylene glycol mono(meth)acrylate, products by esterification of ethylene-oxide-added allyl alcohol with acrylic acid, products by esterification of ethylene-oxide-added methallyl alcohol with acrylic acid, and products by esterification of ethylene-oxide-added crotyl alcohol with acrylic acid; various alkoxypolypropylene glycol mono(meth)acrylates such as methoxypolypropylene glycol mono(meth)acrylate, ethoxypolypropylene glycol mono(meth)acrylate, 1-propoxypolypropylene glycol mono(meth)acrylate, 2-propoxypolypropylene glycol mono(meth)acrylate, 1-butoxypolypropylene glycol mono(meth)acrylate, 2-butoxypolypropylene glycol mono(meth)acrylate, products by esterification of propylene-oxide-added allyl alcohol with acrylic acid, products by esterification of propylene-oxide-added methallyl alcohol with acrylic acid, and products by esterification of propylene-oxide-added crotyl alcohol with acrylic acid; various alkoxypolybutylene glycol mono(meth)acrylates such as methoxypolybutylene glycol mono(meth)acrylate, ethoxypolybutylene glycol mono(meth)acrylate, 1-propoxypolybutylene glycol mono(meth)acrylate, 2-propoxypolybutylene glycol mono(meth)acrylate, 1-butoxypolybutylene glycol mono(meth)acrylate, 2-butoxypolybutylene glycol mono(meth)acrylate, products by esterification of butylene-oxide-added allyl alcohol with acrylic acid, products by esterification of butylene-oxide-added methallyl alcohol with acrylic acid, and products by esterification of butylene-oxide-added crotyl alcohol with acrylic acid; and products by esterification of at-least-two-alkylene-oxides-added alcohols with (meth)acrylic acid, such as methoxypolyethylene glycol polypropylene glycol mono(meth)acrylate, methoxypolyethylene glycol polybutylene glycol mono(meth)acrylate, and methoxypolyethylene glycol polystyrene glycol mono(meth)acrylate. These monomers (a) may be used either alone respectively or in; combinations with each other.

Incidentally, the average molar number of addition of the oxyalkylene groups in the monomer (a) and the constitutional unit (I) (n in the formula (3)) is in the range of 8 to 250. As to this average molar number of addition, there is the following tendency: as the average molar number of addition decreases, the hydrophilicity lowers, while as the average molar number of addition increases, the reactivity lowers. Therefore, the average molar number of addition is favorably in the range of 10 to 220, more favorably 15 to 200, still more favorably 20 to 170, particularly favorably 22 to 150.

The monomers (a) (constitutional units (I)) may be used either alone respectively or in combinations with each other. However, in the case where only one kind thereof is used, it is favorable for ensuring a balance between hydrophilicity and hydrophobicity that the oxyethylene group is indispensable as the oxyalkylene group, and further that the ratio of the oxyethylene group is not less than 50 mol % of the oxyalkylene groups. In addition, in the case where at least two kinds of monomers (a) (constitutional units (I)) are used, it is favorable that at least any one kind of them includes the oxyethylene group as the oxyalkylene group.

The constitutional unit (I) content is not especially limited, but is fitly not less than 5 weight %, favorably not less than 10 weight %, more favorably not less than 20 weight %, still more favorably not less than 30 weight %, particularly favorably not less than 40 weight %, most favorably not less than 50 weight %, of the entirety of the copolymer as the component B.

Specific examples of a monomer (b) to give the constitutional unit (II) of the formula (4) include: unsaturated monocarboxylic acid-based monomers, such as acrylic acid, methacrylic acid, crotonic acid, and their metal salts, ammonium salts, and amine salts; unsaturated dicarboxylic acid-based monomers, such as maleic acid, itaconic acid, citraconic acid, fumaric acid, and their metal salts, ammonium salts, and amine salts; and further, anhydrides of unsaturated dicarboxylic acid-based monomers, such as maleic anhydride, itaconic anhydride, and citraconic anhydride. Of these monomers, the unsaturated monocarboxylic acid-based monomers are favorable, and (meth)acrylic acid and their salts are particularly favorable. These monomers (b) may be used either alone respectively or in combinations with each other.

The constitutional unit (II) content is not especially limited. In the present invention, however, the milliequivalent number of carboxyl groups in the component B is particularly favorably in the range of 0.25 to 5.00 meq per 1 g of the copolymer as the component B assuming all the carboxyl groups in the component B to be in unneutralized forms. This milliequivalent number of carboxyl groups is more favorably in the range of 0.25 to 4.50 meq/g, still more favorably 0.25 to 4.00 meq/g, particularly favorably 0.25 to 3.50 meq/g, most favorably 0.30 to 3.00 meq/g. In the case where this milliequivalent number of carboxyl groups is smaller than 0.25 meq/g, the dispersibility of the copolymer which is the component B is so much low that it is difficult to obtain sufficient fluidity when a cement composition is prepared. On the other hand, in the case where the milliequivalent number of carboxyl groups is larger than 5.00 meq/g, the fluidity is apt to decrease with the passage of time when a cement composition is prepared.

Incidentally, assuming all the carboxyl groups in the component B to be in unneutralized forms, the milliequivalent number of carboxyl groups in the component B can be calculated as follows. For example, in the case where the copolymerization is carried out in the composition ratio of monomer (a)/monomer (b)=90/10 (weight %) using acrylic acid as the monomer (b), the milliequivalent number of carboxyl groups per 1 g of the copolymer is calculated as $(0.1/72) \times 1000 = 1.39$ (meq/g) (calculation example 1), because the molecular weight of acrylic acid is 72. In addition, for example, in the case where the copolymerization is carried out in the composition ratio of monomer (a)/monomer (b)=90/10 (weight %) using sodium methacrylate as the monomer (b), the milliequivalent number of carboxyl groups per 1 g of the copolymer is calculated as $(0.1 \times 86/108)/\{(0.9+0.1 \times 86/108) \times 86\} \times 1000 = 0.95$ (meq/g) (calculation example 2), because the molecular weight of sodium methacrylate is 108 and because the molecular weight of methacrylic acid is 86. Incidentally, also in the case where methacrylic acid is used during the polymerization and where carboxyl groups derived from methacrylic acid are neutralized with sodium hydroxide after the polymerization, the calculation can be carried out in the same way as of the above calculation example 2. In addition, for example, in the case where the copolymerization is carried out in the composition ratio of monomer (a)/monomer (b)=90/10 (weight %) using sodium maleate as the monomer (b), the milliequivalent number of carboxyl groups per 1 g of the copolymer is calculated as $(0.1 \times 116/160)/\{(0.9+0.1 \times 116/160) \times 116/2\} \times 1000 = 1.29$ (meq/g) (calculation example 3), because the molecular weight of sodium maleate is 160 and because the molecular weight of maleic acid is 116 and because maleic acid has two carboxyl groups per molecule.

There is no especial limitation with regard to the ratio between the aforementioned constitutional units (I) and (II) if this ratio satisfies the aforementioned range of the milliequivalent number of carboxyl groups assuming all the carboxyl groups in the component B to be in unneutralized forms. However, this ratio is usually favorably in the range of constitutional unit (I)/constitutional unit (II)=(50 to 99)/(1 to 50) (weight %), more favorably (55 to 99)/(1 to 45) (weight %), still more favorably (60 to 98)/(2 to 40) (weight %), particularly favorably (65 to 98)/(2 to 35) (weight %), most favorably (70 to 97)/(3 to 30) (weight %).

The copolymer which is the component B may further comprise another constitutional unit (III) in addition to the constitutional unit (I) of the general formula (3) and the constitutional unit (II) of the general formula (4), if necessary.

There is no especial limitation with regard to a monomer (c) to give the constitutional unit (III) if this monomer (c) is copolymerizable with the aforementioned monomers (a) and (b). Examples thereof include: half esters and diesters of unsaturated dicarboxylic acids, such as maleic acid, fumaric acid, itaconic acid, and citraconic acid, with alcohols having 1 to 30 carbon atoms; half amides and diamides of the aforementioned unsaturated dicarboxylic acids with amines having 1 to 30 carbon atoms; half esters and diesters of the aforementioned unsaturated dicarboxylic acids with alkyl (poly)alkylene glycols as obtained by addition reactions of 1 to 500 mols of alkylene oxides having 2 to 18 carbon atoms to the aforementioned alcohols or amines; half esters and diesters of the aforementioned unsaturated dicarboxylic acids with glycols having 2 to 18 carbon atoms or with polyalkylene glycols of 2 to 500 in molar number of addition of the foregoing glycols; half amides of maleamic acid with glycols having 2 to 18 carbon atoms or with polyalkylene glycols of 2 to 500 in molar number of addition of the foregoing glycols; (poly)alkylene glycol di(meth)acrylates such as triethylene glycol di(meth)acrylate, (poly)ethylene glycol di(meth)acrylate, polypropylene glycol di(meth) acrylate, and (poly)ethylene glycol (poly)propylene glycol di(meth)acrylate; multifunctional (meth)acrylates such as hexanediol di(meth)acrylate, trimethylolpropane tri(meth) acrylate, and trimethylolpropane di(meth)acrylate; (poly) alkylene glycol dimaleates such as triethylene glycol dimaleate and polyethylene glycol dimaleate; unsaturated sulfonic acids, such as vinylsulfonate, (meth)allylsulfonate, 2-(meth)acryloxyethylsulfonate, 3-(meth)acryloxypropylsulfonate, 3-(meth)acryloxy-2-hydroxypropylsulfonate, 3-(meth)acryloxy-2-hydroxypropylsulfophenyl ether, 3-(meth)acryloxy-2-hydroxypropyloxysulfobenzoate, 4-(meth)acryloxybutylsulfonate, (meth)acrylamidomethylsulfonic acid, (meth)acrylamidoethylsulfonic acid, 2-methylpropanesulfonic acid (meth)acrylamide, and styrenesulfonic acid, and their monovalent metal salts, divalent metal salts, ammonium salts, and organic amine salts; esters of unsaturated monocarboxylic acids with alcohols having 1 to 30 carbon atoms, such as methyl (meth)acrylate, ethyl (meth)acrylate, propyl (meth)acrylate, glycidyl (meth) acrylate, methyl crotonate, ethyl crotonate, and propyl crotonate; amides of unsaturated monocarboxylic acids with amines having 1 to 30 carbon atoms, such as methyl(meth) acrylamide; vinyl aromatic compounds such as styrene, α-methylstyrene, vinyltoluene, and p-methylstyrene; alkanediol mono(meth)acrylates such as 1,4-butanediol mono(meth)acrylate, 1,5-pentanediol mono(meth)acrylate, and 1,6-hexanediol mono(meth)acrylate; dienes such as butadiene, isoprene, 2-methyl-1,3-butadiene, and 2-chloro-1,3-butadiene; unsaturated amides such as (meth) acrylamide, (meth)acrylalkylamide, N-methylol(meth) acrylamide, and N,N-dimethyl(meth)acrylamide; unsaturated cyanes such as (meth)acrylonitrile and α-chloroacrylonitrile; unsaturated esters such as vinyl acetate and vinyl propionate; unsaturated amines such as aminoethyl (meth)acrylate, methylaminoethyl (meth) acrylate, dimethylaminoethyl (meth)acrylate, dimethylaminopropyl (meth)acrylate, dibutylaminoethyl (meth)acrylate, and vinylpyridine; divinyl aromatic compounds such as divinylbenzene; cyanurates such as triallyl cyanurate; allyl compounds such as (meth)allyl alcohol and glycidyl (meth) allyl ether; vinyl ethers or allyl ethers, such as methoxypolyethylene glycol monovinyl ether, polyethylene glycol monovinyl ether, methoxypolyethylene glycol mono(meth) allyl ether, and polyethylene glycol mono(meth)allyl ether; and siloxane derivatives such as polydimethylsiloxanepropylaminomaleamic acid, polydim ethyl siloxaneaminopropyleneaminomaleamic acid, polydimethylsiloxanebis (propylaminomaleamic acid), polydimethylsiloxanebis (dipropyleneaminomaleamic acid), polydimethylsiloxane-(1-propyl-3-acrylate), polydimethylsiloxane-(1-propyl-3-methacrylate), polydimethylsiloxanebis(1-propyl-3-acrylate), and polydimethylsiloxanebis(1-propyl-3-methacrylate). These may be used either alone respectively or in combinations with each other.

There is no especial limitation with regard to the constitutional unit (III) content if it is within the range which does not damage the effects of the present invention, but this content is favorably not more than 70 weight %, more favorably not more than 60 weight %, still more favorably not more than 50 weight %, particularly favorably not more than 40 weight %, most favorably not more than 30 weight %, of the entirety of the copolymer as the component B.

The ratio between the constitutional units composing the copolymer which is the component B is fitly in the range of constitutional unit (I)/constitutional unit (II)/constitutional unit (III)=(5 to 99)/(1 to 50)/(0 to 70) (weight %), favorably (10 to 99)/(1 to 45)/(0 to 60) (weight %), more favorably (20 to 98)/(2 to 40)/(0 to 50) (weight %), still more favorably (30 to 98)/(2 to 35)/(0 to 50) (weight %), particularly favorably (40 to 98)/(2 to 35)/(0 to 40) (weight %), and most favorably (50 to 97)/(3 to 30)/(0 to 30) (weight %) wherein the total of the constitutional units (I), (II) and (III) is always 100 weight %.

The process for obtaining the copolymer which is the component B is not especially limited. For example, the process may comprise the step of, in the presence of a polymerization initiator, copolymerizing monomer components including a monomer to give the constitutional unit (I) (for example, the aforementioned monomer (a)) and a monomer to give the constitutional unit (II) (for example, the aforementioned monomer (b)) as essential components and, if necessary, further including a monomer to give the constitutional unit (III) (for example, the aforementioned monomer (c)). The polymerization can be carried out by conventional methods such as solution polymerization and bulk polymerization. For specific example, the polymerization reaction may be carried out within the range of usually 0 to 120° C. using polymerization initiators, such as ammonium persulfate, alkaline metal persulfates, hydrogen peroxide, and azo compounds, in water or lower alcohols such as methyl alcohol, ethyl alcohol, and isopropyl alcohol.

In addition, thiol-based chain transfer agents such as mercaptoethanol and 3-mercaptopropionic acid can further be used in order to adjust the molecular weight of the resulting copolymer.

The copolymer as obtained in the above way may be used as the component B as it is. However, this copolymer may be used in a polymer salt form by further being neutralized with an alkaline substance, if necessary. Favorable examples of such an alkaline substance include: inorganic substances such as hydroxides and carbonates of mono- and divalent metals (typically, sodium hydroxide); ammonia; and organic amines. Furthermore, it is also possible that the copolymer is used in a solid form by evaporating solvents as used to produce the copolymer.

In the present invention, it is important that the average molecular weight (Y) of the polyalkylene glycol chain portion of the component B satisfies the relation of the below-mentioned equation (1) with the average molecular weight (X) of the aforementioned component A.

$$0.9<(X/Y)<1.1 \quad (1)$$

Only in the case where (X/Y) is in this range, in other words, where the average molecular weight (X) of the component A is nearly equal to the average molecular weight (Y) of the polyalkylene glycol chain portion of the component B, there is a specific interaction between the polyalkylene glycol (which is the component A) and the polyalkylene glycol chain portion of the component B, so that the drying shrinkage reduction effect can be displayed sufficiently even using a small quantity. Incidentally, in the present invention, the average molecular weight (Y) of the polyalkylene glycol chain portion of the component B is the average molecular weight of the portion corresponding to $O(R^4O)_n$—$R^5$ in the aforementioned general formula (3) and can easily be calculated in the following way. For example, if $R^5$, $R^4O$, and n in the general formula (3) are a methyl group, ethylene oxide, and 25 respectively, the average molecular weight (Y) of the polyalkylene glycol chain portion of the component B is calculated as 31+44×25=1,131.

There is no especial limitation with regard to the weight-average molecular weight of the copolymer which is the component B if, as is mentioned above, the average molecular weight (Y) of the polyalkylene glycol chain portion of the component B satisfies the aforementioned equation (1). However, the weight-average molecular weight of the component B is favorably in the range of 1,000 to 500,000, more favorably 5,000 to 300,000. In the case where the weight-average molecular weight of the component B is less than 1,000 or more than 500,000, there are disadvantages in that the dispersibility is low.

It is important that the cement admixture according to the present invention comprises the aforementioned components A and B so that the weight ratio therebetween may be in the range of (A)/(B)=0.02 to 0.3. In the case where the weight ratio between the components A and B is less than (A)/(B)=0.02, the drying shrinkage reduction effect is low. On the other hand, in the case where the weight ratio is more than 0.3, the fluidity is low. Both the drying shrinkage reducibility and the fluidity cannot be satisfied unless the weight ratio between the components A and B ((A)/(B)) is in the aforementioned range.

The production process for the cement admixture according to the present invention is not especially limited. For example, the process can comprise the steps of: copolymerizing the monomers (a) and (b) in the aforementioned way to synthesize the component B; and then mixing the components A and B together so that the weight ratio therebetween may be in the aforementioned range. In this process, it is possible to also easily produce a cement admixture in which the component A does not have the same structure as that of the polyalkylene glycol chain portion of the component B.

Another production process for the cement admixture according to the present invention can also be used wherein this production process, for example, comprises the steps of: carrying out an esterification reaction of a polyalkylene glycol with (meth)acrylic acid; and then stopping this esterification reaction under conditions where a portion of the polyalkylene glycol (=component A) remains unreacted; and then carrying out a polymerization reaction in which the portion of the polyalkylene glycol (=component A) is left to remain unreacted, thereby synthesizing the component B (polyalkylene glycol mono(meth)acrylate/unsaturated carboxylic acid-based copolymer); so that the weight ratio between the components A and B may be in the aforementioned weight ratio range. In addition, the weight ratio of between the components A and B may be adjusted into the aforementioned range by further adding the component A later.

Yet another production process for the cement admixture according to the present invention may also be used wherein this production process, for example, comprises the steps of: synthesizing the component B by what is called "post-esterification reaction of polymer" which is a esterification reaction of an alkoxypolyalkylene glycol having a C1 to C30 hydrocarbon group at one terminal end directly with at least a part of carboxyl groups of a polymer which is obtained by polymerizing a monomer component including the unsaturated carboxylic acid-based monomer (b) as an essential component; and then stopping this esterification reaction so that the weight ratio between the polyalkylene glycol (=component A) and the component B may be in the aforementioned weight ratio range. In this process, the weight ratio of between the components A and B may be adjusted into the aforementioned range by further adding the component A later. Incidentally, in the case where the component B is obtained by the so-called "post-esterification reaction of polymer" in the above way, the milliequivalent number of carboxyl groups in the copolymer (B) assuming all the carboxyl groups in the copolymer (B) to be in unneutralized forms cannot be calculated in the way of the aforementioned calculation examples based on the monomers. Therefore, the milliequivalent number may be calculated by measuring the acid value of the polymer in consideration of counter ion species of carboxyl groups in the polymer.

Cement Composition

The cement composition, according to the present invention, at least comprises the cement admixture according to the present invention, cement, and water as essential components, and is, for example, usable as cement paste or as mortar, concrete, self-levelling materials, and plaster by mixing the cement paste further with aggregates such as sand and ballast. Particularly, the cement composition can be used favorably also for mortar and concrete which are required to have high fluidity, such as high fluid concrete and self-filling concrete.

The aforementioned cement is a substance having a property of hardening by its hydration reaction, and specific examples thereof include: hydraulic cements, such as portland cements of various types (e.g. normal types, high-early-strength types, and ultra-high-early-strength types), various mixed cements (obtained by mixing the aforementioned portland cements with such as blast furnace slag, fly ash, cinder ash, clinker ash, husk ash, and silica), white cements, ultra fast hardenable cements, and alumina cements; and hydraulic materials such as gypsum.

The cement composition according to the present invention is not especially limited with regard to the amount of cement as used per 1 m$^3$ of the cement composition and the amount of water as used per 1 m$^3$ of the cement composition (unit water amount). However, for example, it is recommended that: the unit water amount is in the range of 100 to 185 kg/m$^3$, favorably 120 to 175 kg/m$^3$; the amount of cement as used is in the range of 250 to 800 kg/m$^3$, favorably 270 to 800 kg/m$^3$; and the water/cement weight ratio is in the range of 0.10 to 0.7, favorably 0.2 to 0.65. Thus, the cement composition according to the present invention is usable in the wide range from a poor to rich content, and is effective in all over the range from a high strength concrete with a large unit cement amount to a poor content concrete with a unit cement amount of not larger than 300 kg/m$^3$.

The ratio of the cement admixture (component A+component B) according to the present invention in the cement composition according to the present invention is not especially limited, but is recommended to be in the range of 0.001 to 15 weight %, favorably 0.01 to 10 weight %, more favorably 0.02 to 5 weight %, still more favorably 0.05 to 3 weight %, particular favorably 0.1 to 2 weight %, of the weight of cement. Particularly, when the cement composition is used for such as mortar and concrete containing the hydraulic cement, the ratio of the cement admixture (component A+component B) according to the present invention is recommended to be in the range of 0.01 to 10 weight %, favorably 0.02 to 5 weight %, more favorably 0.05 to 3 weight %, particular favorably 0.1 to 2 weight %, of the weight of the hydraulic cement. In the case where the total ratio of the components A and B is smaller than 0.01 weight %, it is difficult to sufficiently obtain the drying shrinkage reducibility and the fluidity. On the other hand, even if the cement admixture is used in a ratio of larger than 10 weight %, the resultant effects substantially reach the top and do not increase any more, so there are economical disadvantages.

The cement admixture according to the present invention may further comprise conventional cement dispersants. The conventional cement dispersant which is usable is not especially limited, but examples thereof include: various sulfonic dispersants having a sulfonic acid group in their molecules; and various polycarboxylic dispersants having a polyoxyalkylene chain and a carboxyl group in their molecules.

Examples of the aforementioned sulfonic dispersants include ligninsulfonic acid salts, naphthalenesulfonic acid-formaldehyde condensation products, melaminesulfonic acid-formaldehyde condensation products, polystyrenesulfonic acid salts, and aminosulfonic dispersants such as aminoarylsulfonic acid-phenol-formaldehyde condensation products.

Examples of the aforementioned polycarboxylic dispersants include: copolymers obtained by copolymerizing a monomer mixture comprising three essential monomers, namely, a polyalkylene glycol mono(meth)acrylate monomer (having a polyoxyalkylene chain of 2 to 300 in average molar number of addition of alkylene oxides having 2 to 3 carbon atoms), a (meth)acrylic monomer, and an alkyl (meth)acrylate; copolymers obtained by copolymerizing a monomer mixture comprising three essential monomers, namely, a polyalkylene glycol mono(meth)acrylate monomer (having a polyoxyalkylene chain of 2 to 300 in average molar number of addition of alkylene oxides having 2 to 3 carbon atoms), a (meth)acrylic monomer, and any one of (meth)allylsulfonic acid (or its salt), vinylsulfonic acid (or its salt), and P-(meth)allyloxybenzenesulfonic acid (or its salt); copolymers obtained by graft-polymerizing (meth)acrylamide and/or 2-(meth)acrylamido-2-methylpropanesulfonic acid onto copolymers obtained by copolymerizing a monomer mixture comprising three essential monomers, namely, a polyalkylene glycol mono(meth)acrylate monomer (having a polyoxyalkylene chain of 2 to 50 in average molar number of addition of ethylene oxide), a (meth)acrylic monomer, and (meth)allylsulfonic acid (or its salt); copolymers obtained by copolymerizing a monomer mixture comprising four essential monomers, namely, a polyethylene glycol mono(meth)acrylate monomer (having a polyoxyalkylene chain of 5 to 50 in average molar number of addition of ethylene oxide), a polyethylene glycol mono(meth)allyl ether monomer (having a polyoxyalkylene chain of 1 to 30 in average molar number of addition of ethylene oxide), a (meth)acrylic monomer, and any one of (meth)allylsulfonic acid (or its salt) and p-(meth)allyloxybenzenesulfonic acid (or its salt); copolymers obtained by copolymerizing a monomer mixture comprising a polyalkylene glycol mono(meth)allyl ether monomer (having a polyoxyalkylene chain of 2 to 300 in average molar number of addition of alkylene oxides having 2 to 18 carbon atoms) and a maleic monomer as essential components; copolymers obtained by copolymerizing a monomer mixture comprising a polyalkylene glycol mono(meth)allyl ether monomer (having a polyoxyalkylene chain of 2 to 300 in average molar number of addition of alkylene oxides having 2 to 4 carbon atoms) and a polyalkylene glycol maleate monomer as essential components; and copolymers obtained by copolymerizing a monomer mixture comprising a polyalkylene glycol 3-methyl-3-butenyl ether monomer (having a polyoxyalkylene chain of 2 to 300 in average molar number of addition of alkylene oxides having 2 to 4 carbon atoms) and a maleic monomer as essential components. Incidentally, these conventional cement dispersants can also be used in combinations with each other.

In the case where the aforementioned conventional cement dispersant is used, the mixing ratio by weight of the present invention cement admixture (component A+component B) to the conventional cement dispersant is favorably in the range of 5:95 to 95:5, more favorably 10:90 to 90:10, though not uniformly determinable, depending on differences in factors such as kind, composition, and test conditions of the conventional cement dispersant as used.

The cement admixture according to the present invention may further comprise, besides the aforementioned conventional cement dispersant, other conventional cement additives (materials to add to cement) such as (1) to (20) as exemplified below:

(1) water-soluble high-molecular substances, for example: unsaturated carboxylic acid polymers such as poly(acrylic acid) (or its sodium salt), poly(methacrylic acid) (or its sodium salt), poly(maleic acid) (or its sodium salt), and sodium salts of acrylic acid-maleic acid copolymers; nonionic cellulose ethers such as methyl cellulose, ethyl cellulose, hydroxymethyl cellulose, hydroxyethyl cellulose, carboxymethyl cellulose, carboxyethyl cellulose, and hydroxypropyl cellulose; polysaccharides produced by microbiological fermentation such as yeast glucan, xanthane gum, and β-1.3 glucans (which may be either a linear or branched chain type and of which examples include curdlan, paramylon, vacciman, scleroglucan and laminaran); polyacrylamide; poly(vinyl alcohol); starch; starch phosphate; sodium alginate; gelatin; and acrylic acid copolymers having an amino group in their molecules and their quaternized compounds;

(2) high-molecular emulsions, for example: copolymers of various vinyl monomers such as alkyl (meth) acrylates;

(3) retarders, for example: oxycarboxylic acids, such as gluconic acid, glucoheptonic acid, arabonic acid, malic acid and citric acid, and their inorganic or organic salts with such as sodium, potassium, calcium, magnesium, ammonium and triethanolamine; saccharides, for example, monosaccharides such as glucose, fructose, galactose, saccharose, xylose, apiose, ribose, and isomerized saccharides, or oligosaccharides such as disaccharides and trisaccharides, or oligosaccharides such as dextrin, or polysaccharides such as dextran, or molasses including them; sugar alcohols such as sorbitol; magnesium silicofluoride; phosphoric acid and its salts or borates; aminocarboxylic acids and their salts; alkali-soluble proteins; fumic acid; tannic acid; phenol; polyhydric alcohols such as glycerol; and phosphonic acids and derivatives therefrom, such as aminotri (methylenephosphonic acid), 1-hydroxyethylidene-1, 1-diphosphonic acid, ethylenediaminetetra (methylenephosphonic acid), diethylenetriaminepenta (methylenephosphonic acid), and their alkaline metal salts and alkaline earth metal salts;

(4) high-early-strength agents and promotors, for example: soluble calcium salts such as calcium chloride, calcium nitrite, calcium nitrate, calcium bromide, and calcium iodide; chlorides such as iron chloride and magnesium chloride; sulfates; potassium hydroxide; sodium hydroxide; carbonates; thiosulfates; formic acid and formates such as calcium formate; alkanol amines; alumina cements; and calcium aluminate silicate;

(5) mineral oil base defoaming agents, for example: kerosine and liquid paraffin;

(6) oils-and-fats base defoaming agents, for example: animal and plant oils, sesame oil, castor oil and their alkylene oxide adducts;

(7) fatty acid base defoaming agents, for example: oleic acid, stearic acid and their alkylene oxide adducts;

(8) fatty acid ester base defoaming agents, for example: glycerol monoricinolate, alkenyl succinic acid derivatives, sorbitol monolaurate, sorbitol trioleate, and natural wax;

(9) oxyalkylene base defoaming agents, for example: polyoxyalkylenes such as (poly)oxyethylene (poly) oxypropylene adducts; (poly)oxyalkyl ethers such as diethylene glycol heptyl ether, polyoxyethylene oleyl ether, polyoxypropylene butyl ether, polyoxyethylene polyoxypropylene 2-ethylhexyl ether, and adducts obtained by addition reactions of oxyethylene oxypropylene to higher alcohols having 12 to 14 carbon atoms; (poly)oxyalkylene (alkyl) aryl ethers such as polyoxypropylene phenyl ether and polyoxyethylene nonyl phenyl ether; acetylene ethers as formed by addition polymerization of alkylene oxides to acetylene alcohols such as 2,4,7,9-tetramethyl-5-decyne-4,7-diol, 2,5-dimethyl-3-hexyne-2,5-diol, and 3-methyl-1-butyn-3-ol; (poly)oxyalkylene fatty acid esters such as diethylene glycol oleate, diethylene glycol laurate, and ethylene glycol distearate; (poly)oxyalkylene sorbitan fatty acid esters such as (poly)oxyethylene sorbitan monolaurate and (poly)oxyethylene sorbitan trioleate; (poly)oxyalkylene alkyl (aryl) ether sulfuric acid ester salts such as sodium polyoxypropylene methyl ether sulfate and sodium polyoxyethylene dodecylphenol ether sulfate; (poly)oxyalkylene alkyl phosphoric acid esters such as (poly)oxyethylene stearyl phosphate; (poly)oxyalkylene alkylamines such as polyoxyethylene laurylamine; and polyoxyalkylene amide;

(10) alcohol base defoaming agents, for example: octyl alcohol, hexadecyl alcohol, acetylene alcohol, and glycols;

(11) amide base defoaming agents, for example: acrylate polyamines;

(12) phosphoric acid ester base defoaming agents, for example: tributyl phosphate and sodium octyl phosphate;

(13) metal soap base defoaming agents, for example: aluminum stearate and calcium oleate;

(14) silicone base defoaming agents, for example: dimethyl silicone oils, silicone pastes, silicone emulsions, organic-denatured polysiloxanes (polyorganosiloxanes such as dimethyl polysiloxane), and fluorosilicone oils;

(15) AE agents, for example: resin soap, saturated or unsaturated fatty acids, sodium hydroxystearate, lauryl sulfate, ABS (alkylbenzenesulfonic acids), LAS (linear alkylbenzenesulfonic acids), alkanesulfonates, polyoxyethylene alkyl (phenyl) ethers, polyoxyethylene alkyl (phenyl) ether sulfuric acid esters or their salts, polyoxyethylene alkyl (phenyl) ether phosphoric acid esters or their salts, protein materials, alkenylsulfosuccinic acids, and α-olefinsulfonates;

(16) other surfactants, for example: alkyl diphenyl ether sulfonates as formed by ether-bonding of two phenyl groups having a sulfonic acid group, which may have an alkyl or alkoxy group as a substituent; various kinds of anionic surfactants; various kinds of cationic surfactants such as alkylamine acetate and alkyltrimethylammonium chloride; various kinds of nonionic surfactants; and various kinds of amphoteric surfactants;

(17) waterproofing agents, for example: fatty acids (or their salts), fatty acid esters, oils and fats, silicone, paraffin, asphalt, and wax;

(18) anticorrosives, for example: nitrous acid salts, phosphoric acid salts, and zinc oxide;

(19) fissure-reducing agents, for example: polyoxyalkyl ethers; and

(20) swelling materials, for example: ettringite base and lime base ones.

The cement composition according to the present invention may further comprise conventional cement additives (materials to add to cement) other than the above. Examples thereof include: cement humectants, thickeners, flocculants, strength-enhancing agents, self-levelling agents, colorants, moldproofing agents, pozzolan, and zeolite. Incidentally, these cement additives (materials to add to cement) can be contained either alone respectively or in combinations with each other.

Examples of particularly favorable embodiments with regard to components other than cement and water in the cement composition according to the present invention include the following 1) to 6):

1) A combination comprising the following two essential components: (1) the present invention cement admixture and (2) the oxyalkylene base defoaming agent. Incidentally, the mixing ratio by weight of (2) the oxyalkylene base defoaming agent is favorably in the range of 0.01 to 10 weight % of the component B in (1) the present invention cement admixture.

2) A combination comprising the following two essential components: (1) the present invention cement admixture and (2) the sulfonic dispersant having a sulfonic acid group in its molecule. Incidentally, the mixing ratio by weight of (1) the present invention cement admixture to (2) the sulfonic dispersant is favorably in the range of 5:95 to 95:5, more favorably 10:90 to 90:10.

3) A combination comprising the following two essential components: (1) the present invention cement admixture and (2) the ligninsulfonic acid salt. Incidentally, the mixing ratio by weight of (1) the present invention cement admixture to (2) the ligninsulfonic acid salt is favorably in the range of 5:95 to 95:5, more favorably 10:90 to 90:10.

4) A combination comprising the following two essential components: (1) the present invention cement admixture and (2) a material-separation-decreasing agent. Usable examples of the material-separation-decreasing agent include: various thickeners such as nonionic cellulose ethers; and compounds having a hydrophobic substituent, namely, a C4 to C30 hydrocarbon chain, as a partial structure, and further having a polyoxyalkylene chain of 2 to 300 in average molar number of addition of C2 to C18 alkylene oxides as another partial structure. Incidentally, the mixing ratio by weight of (1) the present invention cement admixture to (2) the material-separation-decreasing agent is favorably in the range of 10:90 to 99.99:0.01, more favorably 50:50 to 99.9:0.1. The cement composition comprising this combination is favorable as high fluid concrete, self-filling concrete, and self-levelling materials.

5) A combination comprising the following two essential components: (1) the present invention cement admixture and (2) the retarder. Incidentally, the mixing ratio by weight of (1) the present invention cement admixture to (2) the retarder is favorably in the range of 50:50 to 99.9:0.1, more favorably 70:30 to 99:1.

6) A combination comprising the following two essential components: (1) the present invention cement admixture and (2) the promotor. Incidentally, the mixing ratio by weight of (1) the present invention cement admixture to (2) the promotor is favorably in the range of 10:90 to 99.9:0.1, more favorably 20:80 to 99:1.

Effects and Advantages of the Invention

The present invention enables to display excellent cracking inhibition effect and further to bring about good fluidity even if the quantity of the addition is small.

DETAILED DESCRIPTION OF THE PREFERRED EMBODIMENTS

Hereinafter, the present invention is more specifically illustrated by the following examples of some preferred embodiments in comparison with comparative examples not according to the invention. However, the invention is not limited to the below-mentioned examples. Incidentally, in the examples, unless otherwise noted, the units "part(s)" and "%" denote those by weight. In addition, the weight-average molecular weight of copolymer (B) is in terms of polyethylene glycol by gel permeation chromatography (GPC).

Used as the raw polyalkylene glycols (A) are the following four:

Polyalkylene Glycols (A)

(A-1): 1-Butoxypolyethylene glycol (average molar number of addition of ethylene oxide: 25, average molecular weight (X) as calculated from the terminal end group, the sort of the oxyalkylene group, and its average molar number of addition: 1,174)

(A-2): 1-Butoxypolyethylene glycol (average molar number of addition of ethylene oxide: 75, average molecular weight (X) as calculated from the terminal end group, the sort of the oxyalkylene group, and its average molar number of addition: 3,374)

(A-3): Methoxypolyethylene glycol (average molar number of addition of ethylene oxide: 25, average molecular weight (X) as calculated from the terminal end group, the sort of the oxyalkylene group, and its average molar number of addition: 1,132)

(A-4): Polyethylene glycol (average molar number of addition of ethylene oxide: 5, average molecular weight (X) as calculated from the terminal end group, the sort of the oxyalkylene group, and its average molar number of addition: 238)

The raw polyalkylene glycol mono(meth)acrylate/(meth)acrylic acid-based copolymers (B) were obtained in the following ways:

PRODUCTION EXAMPLE 1

Production of Copolymer (B-1)

First of all, 1,698 parts of ion-exchanged water was placed into a glass-made reactor as equipped with a thermometer, a stirrer, a dropping funnel, a nitrogen-introducing tube and a reflux condenser. The internal air of the reactor was then replaced with nitrogen under stirring, and the reactor was then heated to 80° C. under the nitrogen atmosphere. Next, an aqueous monomer solution, as prepared by mixing 1,668 parts of 1-butoxypolyethylene glycol monomethacrylate (average molar number of addition of ethylene oxide: 25), 332 parts of methacrylic acid, 500 parts of ion-exchanged water, and 16.7 parts of 3-mercaptopropionic acid (chain transfer agent), was dropwise added into the reactor over a period of 4 hours, and simultaneously with the initiation of this dropwise addition of the aqueous monomer solution, an aqueous initiator solution comprising 23 parts of ammonium persulfate and 207 parts of ion-exchanged water was dropwise added into the reactor over a period of 5 hours. Subsequently to the end of the dropwise addition of the aqueous initiator solution, the internal temperature of the reactor was maintained at 80° C. for 1 hour to complete the polymerization reaction. Thereafter, the resultant reaction mixture was neutralized with a 30% aqueous sodium hydroxide solution, thus obtaining an aqueous solution of a copolymer (B-1) having a weight-average molecular weight of 27,000. Incidentally, the milliequivalent number of carboxyl groups in the copolymer (B-1) was 1.93 (meq/g) per 1 g of the copolymer (B-1) assuming all the carboxyl groups in the copolymer (B-1) to be in unneutralized forms. In addition, the average molecular weight (Y) of the polyalkylene glycol chain portion, as calculated from the structures of the used monomers, was 1,173.

PRODUCTION EXAMPLE 2

Production of Copolymer (B-2)

First of all, 847.7 parts of ion-exchanged water was placed into the same reactor as that used in Production Example 1. The internal air of the reactor was then replaced with nitrogen under stirring, and the reactor was then heated to 80° C. under the nitrogen atmosphere. Next, an aqueous monomer solution, as prepared by mixing 275.6 parts of 1-butoxypolyethylene glycol monomethacrylate (average molar number of addition of ethylene oxide: 75), 24.4 parts of methacrylic acid, 200 parts of ion-exchanged water, and 2.3 parts of 3-mercaptopropionic acid (chain transfer agent), was dropwise added into the reactor over a period of 4 hours, and simultaneously with the initiation of this dropwise addition of the aqueous monomer solution, an aqueous initiator solution comprising 3.4 parts of ammonium persulfate and 146.6 parts of ion-exchanged water was dropwise added into the reactor over a period of 5 hours. Subsequently to the end of the dropwise addition of the aqueous initiator solution, the internal temperature of the reactor was maintained at 80° C. for 1 hour to complete the polymerization reaction. Thereafter, the resultant reaction mixture was neutralized with a 30% aqueous sodium hydroxide solution, thus obtaining an aqueous solution of a copolymer (B-2) having a weight-average molecular weight of 38,000. Incidentally, the milliequivalent number of carboxyl groups in the copolymer (B-2) was 0.95 (meq/g) per 1 g of the copolymer (B-2) assuming all the carboxyl groups in the copolymer (B-2) to be in unneutralized forms. In addition, the average molecular weight (Y) of the polyalkylene glycol chain portion, as calculated from the structures of the used monomers, was 3,373.

PRODUCTION EXAMPLE 3

Production of Copolymer (B-3)

First of all, 1,698 parts of ion-exchanged water was placed into the same reactor as that used in Production Example 1. The internal air of the reactor was then replaced with nitrogen under stirring, and the reactor was then heated to 80° C. under the nitrogen atmosphere. Next, an aqueous monomer solution, as prepared by mixing 1,668 parts of methoxypolyethylene glycol monomethacrylate (average molar number of addition of ethylene oxide: 25), 332 parts of methacrylic acid, 500 parts of ion-exchanged water, and 16.7 parts of 3-mercaptopropionic acid (chain transfer agent), was dropwise added into the reactor over a period of 4 hours, and simultaneously with the initiation of this dropwise addition of the aqueous monomer solution, an aqueous initiator solution comprising 23 parts of ammonium persulfate and 207 parts of ion-exchanged water was dropwise added into the reactor over a period of 5 hours. Subsequently to the end of the dropwise addition of the aqueous initiator solution, the internal temperature of the reactor was maintained at 80° C. for 1 hour to complete the polymerization reaction. Thereafter, the resultant reaction mixture was neutralized with a 30% aqueous sodium hydroxide solution, thus obtaining an aqueous solution of a copolymer (B-3) having a weight-average molecular weight of 24,000. Incidentally, the milliequivalent number of carboxyl groups in the copolymer (B-3) was 1.93 (meq/g) per 1 g of the copolymer (B-3) assuming all the carboxyl groups in the copolymer (B-3) to be in unneutralized forms. In addition, the average molecular weight (Y) of the polyalkylene glycol chain portion, as calculated from the structures of the used monomers, was 1,131.

EXAMPLES 1 TO 10 AND COMPARATIVE EXAMPLES 1 TO 8

An amount of 400 g of normal portland cement (produced by Pacific Cement Co., Ltd.) and 800 g of Toyoura standard sand were kneaded without water at a low speed for 30 seconds using a HOBART type mortar mixer (N-50 model, produced by HOBART Corporation). The aforementioned polyalkylene glycol (A) and the aforementioned copolymer (B) were weighed out in the ratios of Tables 1 and 2 and then diluted with ion-exchanged water to the total weight of 240 g, and the resultant mixture was added to the above-kneaded cement-sand mixture. Then, the resultant mixture was kneaded at a middle speed for 3 minutes, thus obtaining mortar. Incidentally, the mixing ratio (%) of each component in the Tables is weight % (in terms of solid content), based on cement, of each component.

The resultant mortar was evaluated in the following ways:
(Fluidity (Mortar Flow Value))

The resultant mortar was fully filled into a hollow cylinder of 55 mm both in inner diameter and in height as placed on a horizontal table. After 5 minutes from the kneading initiation, this cylinder was gently lifted in perpendicular, and the major and minor axes of the mortar as spread onto the table were measured, and the average value thereof was regarded as the mortar flow value (mm). Incidentally, if the quantity of entrained air is large, the flow value and the shrinkage amount both result in being apparently large. Therefore, the quantity of air was adjusted to 5±1% by fitly using a (oxyalkylene-based) defoaming agent for the quantity of entrained air to be a definite value. The results are shown in Tables 1 and 2. Incidentally, it can be said that:the larger this mortar flow value (mm) is, the higher the fluidity is.
(Shrinkage Reducibility (Change of Length))

First, a specimen (4×4×16 cm) was prepared according to JIS-A-1129 as follows. The mold frame was precoated with silicone grease for the purposes of water cutting and easy mold releasing, and an arrangement was carried out so that a gauge plug might be fitted on both sides of the specimen. Then, the mortar as obtained above was cast into this mold frame, and the resultant mortar-containing mold frame was then placed into an thermohumidistat (PL-2G, produced by Tabai Espec Co., Ltd.) as set at a temperature of 20° C. and a humidity of 60%, whereby initial curing was carried out. After 4 days, the resultant specimen was released from the mold frame, and the silicone grease as attached to the surface of the specimen was washed off with water using a sponge-made scrubbing brush. Thereafter, specimen was cured in still water of 20° C. for 7 days.

Water was wiped off from the surface of the specimen (as cured above in still water for 7 days) with a paper towel, and immediately thereafter the length of the specimen was measured with a dial gauge (produced by Nishi Nihon Shikenki Co., Ltd.) in accordance with JIS-A-1129, and the length at this time was taken as the standard. Thereafter, the specimen was preserved in the thermohumidistat as set at a temperature of 20° C. and a humidity of 60%. After 28 days from the ending date of the curing in water, the length was measured again to determine a change of length, namely, a difference ($\mu$m) as given by subtracting a length of the specimen 28 days after the standard date (ending date of the curing in water) from a length of the specimen at the standard date (for example, the case where the change of length is 247 $\mu$m shows that the specimen shrank by 247 $\mu$m from its length at the standard date). The results are shown in Tables 1 and 2. Incidentally, it can be said that: the less the value of the change of length ($\mu$m) is, the greater the shrinkage reduction effect is and the less the structure cracked due to shrinkage.

TABLE 1

|  | Mixing | A/B (weight ratio) | Component A (%) | Component B (%) | Total (%) of A + B | Average molecular weight ratio X/Y | Mortar flow value (mm) | Change of length ($\mu$m) |
| --- | --- | --- | --- | --- | --- | --- | --- | --- |
| Example 1 | A-1 + B-1 | 0.05 | 0.0214 | 0.4286 | 0.4500 | 1.0 | 135 | 247 |
| Example 2 | A-1 + B-1 | 0.10 | 0.0409 | 0.4091 | 0.4500 | 1.0 | 130 | 237 |
| Example 3 | A-1 + B-1 | 0.20 | 0.0750 | 0.3750 | 0.4500 | 1.0 | 125 | 218 |
| Example 4 | A-2 + B-2 | 0.05 | 0.0152 | 0.3048 | 0.3200 | 1.0 | 144 | 249 |
| Example 5 | A-2 + B-2 | 0.10 | 0.0291 | 0.2909 | 0.3200 | 1.0 | 139 | 242 |
| Example 6 | A-2 + B-2 | 0.20 | 0.0533 | 0.2667 | 0.3200 | 1.0 | 132 | 225 |
| Example 7 | A-3 + B-3 | 0.02 | 0.0047 | 0.2353 | 0.2400 | 1.0 | 142 | 256 |
| Example 8 | A-3 + B-3 | 0.05 | 0.0114 | 0.2286 | 0.2400 | 1.0 | 140 | 252 |
| Example 9 | A-3 + B-3 | 0.10 | 0.0218 | 0.2182 | 0.2400 | 1.0 | 136 | 246 |
| Example 10 | A-3 + B-3 | 0.20 | 0.0400 | 0.2000 | 0.2400 | 1.0 | 130 | 232 |

TABLE 2

|  | Mixing | A/B (weight ratio) | Component A (%) | Component B (%) | Total (%) of A + B | Average molecular weight ratio X/Y | Mortar flow value (mm) | Change of length ($\mu$m) |
| --- | --- | --- | --- | --- | --- | --- | --- | --- |
| Comparative Example 1 | B-1 | 0.00 | 0.0000 | 0.4500 | 0.4500 | — | 139 | 260 |
| Comparative Example 2 | A-1 + B-1 | 0.35 | 0.1167 | 0.3333 | 0.4500 | 1.0 | 103 | 193 |
| Comparative Example 3 | B-2 | 0.00 | 0.0000 | 0.3200 | 0.3200 | — | 147 | 263 |
| Comparative Example 4 | A-2 + B-2 | 0.35 | 0.0830 | 0.2370 | 0.3200 | 1.0 | 107 | 202 |
| Comparative Example 5 | B-3 | 0.00 | 0.0000 | 0.2400 | 0.2400 | — | 145 | 262 |
| Comparative Example 6 | A-3 + B-3 | 0.005 | 0.0012 | 0.2388 | 0.2400 | 1.0 | 143 | 261 |
| Comparative Example 7 | A-3 + B-3 | 0.35 | 0.0622 | 0.1778 | 0.2400 | 1.0 | 110 | 213 |
| Comparative Example 8 | A-4 + B-3 | 0.20 | 0.0400 | 0.2000 | 0.2400 | 0.2 | 128 | 259 |

From Table 2, it has been found as follows. As to Comparative Examples 1, 3, 5, and 6, the fluidity is high, but the shrinkage reduction effect is not obtained enough, because the mixing ratio of the component A is too low when compared with the range as defined in the present invention. On the other hand, as to Comparative Examples 2, 4, and 7, the shrinkage reduction effect is great, but the fluidity is not obtained enough, because the mixing ratio of the component A is too high when compared with the range as defined in the present invention. In addition, as to Comparative Example 8, the fluidity is high, but the shrinkage reduction effect is not obtained enough, because the average molecular weight (X) of the component A is too low when compared with the average molecular weight (Y) of the polyalkylene glycol chain portion of the component B.

In contrast to the above, from Table 1, it has been found that all the Examples of the cement composition according to the present invention display excellent shrinkage reducibility and excellent fluidity.

Various details of the invention may be changed without departing from its spirit not its scope. Furthermore, the foregoing description of the preferred embodiments according to the present invention is provided for the purpose of illustration only, and not for the purpose of limiting the invention as defined by the appended claims and their equivalents.

What is claimed is:

1. A cement admixture, which comprises a polyalkylene glycol (A) and a copolymer (B), wherein:

the copolymer B comprises essential constitutional unit (I) of general formula (3) below and essential constitutional unit (II) of general formula (4) below:

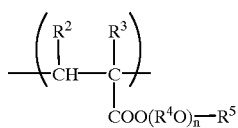

(3)

wherein:
$R^2$ and $R^3$, independently of each other, represent a hydrogen atom or a methyl group;
$R^4O$ represents an oxyalkylene group having 2 to 18 carbon atoms, wherein the $R^4O$-repeating units are either identical with or different from each other and, if the $R^4O$-repeating units are in the form of a mixture of at least two thereof, they are formed by any of block addition, random addition, and alternating addition;
n is an average molar number of addition of the oxyalkylene groups and represents a number of 8 to 250; and
$R^5$ represents a hydrogen atom or a hydrocarbon group having 1 to 30 carbon atoms; and

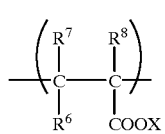

(4)

wherein:
$R^6$, $R^7$, and $R^8$, independently of each other, denote a hydrogen atom, a methyl group or a $(CH_2)_pCOOX$ group;
X denotes a hydrogen atom, a monovalent metal, a divalent metal, an ammonium group or an organic amine group; and p denotes an integer of 0 to 2;
wherein:
1) when two COOX groups are present in general formula (4),
   a) the two COOX groups form an anhydride group or
   b) the two COOX groups are present where they are;
2) when three COOX groups are present in general formula (4),
   a) two of the three COOX groups form an anhydride group and a remaining one COOX group is present where said remaining one COOX group is or
   b) the three COOX groups are present where they are; or
3) when four COOX groups are present in general formula (4),
   a) two COOX groups form an anhydride group and two remaining COOX groups form an anhydride group or
   b) two COOX groups form an anhydride group and two remaining COOX groups are present where they are or
   c) the four COOX groups are present where they are;
the average molecular weight (X) of the polyalkylene glycol (A) is in the range of 400 to 10,000;
the average molecular weight (X) of the polyalkylene glycol (A) and the average molecular weight (Y) of a polyalkylene glycol chain portion of the copolymer (B) satisfy the following equation (1):

$$0.9<(X/Y)<1.1 \qquad (1);$$

and
the weight ratio of the polyalkylene glycol (A) to the copolymer (B) is in the range of (A)/(B)=0.02 to 0.3.

2. A cement admixture according to claim 1, wherein the milliequivalent number of carboxyl groups in the copolymer (B) is in the range of 0.25 to 5.00 meq/g assuming all the carboxyl groups in the copolymer (B) to be in unneutralized forms.

3. A cement composition, which at least comprises the cement admixture as recited in claim 1, water, and cement.

4. A cement composition, which at least comprises the cement admixture as recited in claim 2, water, and cement.

* * * * *